United States Patent
Katayama et al.

(10) Patent No.: US 12,026,460 B2
(45) Date of Patent: Jul. 2, 2024

(54) DIALOGUE DATA GENERATION DEVICE, DIALOGUE DATA GENERATION METHOD, AND PROGRAM

(71) Applicant: NIPPON TELEGRAPH AND TELEPHONE CORPORATION, Tokyo (JP)

(72) Inventors: Taichi Katayama, Tokyo (JP); Atsushi Otsuka, Tokyo (JP); Ko Mitsuda, Tokyo (JP); Kuniko Saito, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 775 days.

(21) Appl. No.: 17/053,744

(22) PCT Filed: May 7, 2019

(86) PCT No.: PCT/JP2019/018268
§ 371 (c)(1),
(2) Date: Jun. 21, 2021

(87) PCT Pub. No.: WO2019/216316
PCT Pub. Date: Nov. 14, 2019

(65) Prior Publication Data
US 2021/0342553 A1    Nov. 4, 2021

(30) Foreign Application Priority Data

May 9, 2018    (JP) ................................ 2018-090637

(51) Int. Cl.
G06F 40/20     (2020.01)
G06F 40/40     (2020.01)
G06N 3/08      (2023.01)

(52) U.S. Cl.
CPC .............. *G06F 40/20* (2020.01); *G06F 40/40* (2020.01); *G06N 3/08* (2013.01)

(58) Field of Classification Search
CPC ............ G06F 40/20; G06F 40/40; G06N 3/08
(Continued)

(56) References Cited

U.S. PATENT DOCUMENTS 8,275,803 B2 *  9/2012  Brown ................. G06F 16/334
                                               705/14.44
8,332,394 B2 * 12/2012  Fan .......................... G06N 5/02
                                               707/723
(Continued)

OTHER PUBLICATIONS

Higashinaka et al. (2006) "Incorporating Discourse Features into Confidence Scoring of Intention Recognition Results n Spoken Dialogue Systems," Speech Communication, vol. 48, No. 3-4, pp. 417-436.
(Continued)

*Primary Examiner* — Susan I McFadden

(57) ABSTRACT

To make it possible to generate dialogue data for generating a question sentence to deeply delve conversation at a low cost. For each of a plurality of pieces of data each including a set of a first utterance sentence that is a sentence uttered by a first user, a second utterance sentence that is a sentence uttered by a second user and is a response to the first utterance sentence, and a third utterance sentence that is a sentence uttered by the first user and is a response to the second utterance sentence, a dialogue data generation unit 110 generates a set of the first utterance sentence of the data and the second utterance sentence of the data as dialogue data when the second utterance sentence of the data is a question sentence using an interrogative.

20 Claims, 6 Drawing Sheets

(58) Field of Classification Search
USPC .............................................................. 704/9
See application file for complete search history.

(56) References Cited

U.S. PATENT DOCUMENTS

| | | | | |
|---|---|---|---|---|
| 8,515,764 | B2* | 8/2013 | Nakano | G10L 15/32 |
| | | | | 704/251 |
| 8,768,925 | B2* | 7/2014 | Brown | G06F 16/3329 |
| | | | | 704/9 |
| 9,703,861 | B2* | 7/2017 | Brown | G06F 16/3344 |
| 10,319,379 | B2* | 6/2019 | Ikeno | G10L 13/08 |
| 10,514,881 | B2* | 12/2019 | Nagasaka | G06F 40/20 |
| 10,614,106 | B2* | 4/2020 | Kelsey | G06F 40/151 |
| 10,762,305 | B2* | 9/2020 | Liu | G06N 3/045 |
| 10,936,664 | B2* | 3/2021 | Abe | G06F 16/3329 |
| 10,991,366 | B2* | 4/2021 | Kang | G10L 15/14 |
| 11,087,757 | B2* | 8/2021 | Ikeno | G10L 13/08 |
| 11,256,658 | B2* | 2/2022 | Kruengkrai | G06N 3/045 |
| 11,734,520 | B2* | 8/2023 | Sugiyama | G10L 15/22 |
| | | | | 704/235 |

OTHER PUBLICATIONS

Katayama et al. (2018) "Question Generation to Deepen Your Talk," Journal of the Japan Association of Artificial Intelligence, pp. 1-3.

* cited by examiner

Fig. 3

| FIRST UTTERANCE SENTENCE | SECOND UTTERANCE SENTENCE | THIRD UTTERANCE SENTENCE | IS SECOND UTTERANCE SENTENCE QUESTION? |
|---|---|---|---|
| I WENT TO KYOTO RECENTLY. | @A WHAT DID YOU GO THERE TO DO? | @B I WENT TO THERE TO SEE AUTUMN LEAVES. | ○ |
| I AM NOT FEELING WELL SINCE THIS MORNING. | @c WHAT HAPPENED? | @d DID I DRINK TOO MUCH? http://xxx.ttt | ○ |
| GOOD MORNING. | @e GOOD MORNING. | @f WILL WE MEET AT 10? | × |
| DID YOU WATCH TV DRAMA YESTERDAY? | @g I WATCHED IT. | @h IT WAS REALLY GOOD, ISN'T IT? | × |
| TODAY IS FRIDAY. | @i FRIDAY IS DAY FOR DRINKING PARTY, RIGHT? | @p REALLY? | × |

Fig. 4

| FIRST UTTERANCE | SECOND UTTERANCE | THIRD UTTERANCE |
|---|---|---|
| I WENT TO KYOTO RECENTLY. | WHAT DID YOU GO THERE TO DO? | I WENT TO THERE TO SEE AUTUMN LEAVES. |
| I AM NOT FEELING WELL SINCE THIS MORNING. | WHAT HAPPENED? | DID I DRINK TOO MUCH? |

DIALOGUE DATA OF UTTERANCE SENTENCES:
I WENT TO KYOTO RECENTLY.
I AM NOT FEELING WELL SINCE THIS MORNING.

DIALOGUE DATA OF QUESTION SENTENCES:
WHAT DID YOU GO THERE TO DO?
WHAT HAPPENED?

DIALOGUE DATA GENERATION DEVICE, DIALOGUE DATA GENERATION METHOD, AND PROGRAM

CROSS-REFERENCE TO RELATED APPLICATIONS

This application is a U.S. 371 Application of International Patent Application No. PCT/JP2019/018268, filed on 7 May 2019, which application claims priority to and the benefit of JP Application No. 2018-090637, filed on 9 May 2018, the disclosures of which are hereby incorporated herein by reference in their entireties.

TECHNICAL FIELD

The present invention relates to a dialogue data generation device, a dialogue data generation method, and a program and, in particular, to a dialogue data generation device, a dialogue data generation method, and a program for generating a question sentence in a dialogue system.

BACKGROUND ART

A dialogue system for holding a dialogue with a user is roughly divided into the two types of a task-oriented dialogue system and a non-task-oriented dialogue system.

The task-oriented dialogue system is one in which a specific task is achieved by holding a dialogue with a system. For example, the task-oriented dialogue system is used in flight reservation systems or weather information guidance systems (NPL 1). Such systems generally have a structure called a frame (constituted by a slot including a slot name and a slot value), and a dialogue proceeds on the basis of the frame.

The task-oriented dialogue system has such a structure and therefore can obtain information out of the other party by generating a question sentence to hear an unfilled slot.

On the other hand, the non-task-oriented dialogue system handles a meaningless dialogue, and the content of a dialogue is a so-called chat.

CITATION LIST

Non Patent Literature

[NPL 1] Ryuichiro Higashinaka, Katsuhito Sudoh, Mikio Nakano, "Incorporating Discourse Features into Confidence Scoring of Intention Recognition Results in Spoken Dialogue Systems", Speech Communication, Volume 48, Issues 3-4, 2006, pp.417-436.

SUMMARY OF THE INVENTION

Technical Problem

However, the non-task-oriented dialogue system does not have a structure called a slot unlike the task-oriented dialogue system since a chat contains various topics, and it is not obvious what type of an interrogative is used to ask a question.

For this reason, there has been a problem that the non-task-oriented dialogue system has a difficulty in generating a question sentence to deeply delve the utterance of the other party.

In order to solve such a problem, the conventional non-task-oriented dialogue system realizes a dialogue with a user through a rule base method or a machine learning method.

However, there has been a problem that a rule is described by hand in the rule base method and therefore it is necessary to make a large amount of rules by hand to extensively deeply delve a dialogue.

Further, in the machine learning method, data such as an utterance that is a question sentence corresponding to the utterance of the other party does not exist, and it is difficult to prepare an amount of data for substantial learning. That is, there has been a problem that it is difficult to prepare a corpus (learning data) for machine learning aimed to generate a question sentence.

In summary, there has been a problem that the conventional non-task-oriented dialogue system cannot realize a dialogue system to deeply delve a dialogue at a low cost and therefore cannot smoothen the interaction between a dialogue system and a user.

The present invention has been made in view of the above circumstances and has an object of providing a dialogue data generation device, a dialogue data generation method, and a program that make it possible to generate dialogue data for generating a question sentence to deeply delve conversation at a low cost.

Means for Solving the Problem

A dialogue data generation device according to the present invention includes: an input unit that receives an input of a plurality of pieces of data each including a set of a first utterance sentence that is a sentence uttered by a first user, a second utterance sentence that is a sentence uttered by a second user and is a response to the first utterance sentence, and a third utterance sentence that is a sentence uttered by the first user and is a response to the second utterance sentence; and a dialogue data generation unit that generates, for each of the plurality of pieces of data received by the input unit, a set of the first utterance sentence of the data and the second utterance sentence of the data as dialogue data when the second utterance sentence of the data is a question sentence using an interrogative.

Further, a dialogue data generation method according to the present invention includes: receiving an input of a plurality of pieces of data each including a set of a first utterance sentence that is a sentence uttered by a first user, a second utterance sentence that is a sentence uttered by a second user and is a response to the first utterance sentence, and a third utterance sentence that is a sentence uttered by the first user and is a response to the second utterance sentence by an input unit; and generating, for each of the plurality of pieces of data received by the input unit, a set of the first utterance sentence of the data and the second utterance sentence of the data as dialogue data when the second utterance sentence of the data is a question sentence using an interrogative by a dialogue data generation unit.

According to the dialogue data generation device and the dialogue data generation method of the present invention, the input unit receives an input of a plurality of pieces of data each including a set of a first utterance sentence that is a sentence uttered by a first user, a second utterance sentence that is a sentence uttered by a second user and is a response to the first utterance sentence, and a third utterance sentence that is a sentence uttered by the first user and is a response to the second utterance sentence.

Then, the dialogue data generation unit generates, for each of the plurality of pieces of data received by the input unit, a set of the first utterance sentence of the data and the second utterance sentence of the data as dialogue data when the second utterance sentence of the data is a question sentence using an interrogative.

As described above, for each of a plurality of pieces of data each including a set of a first utterance sentence that is a sentence uttered by a first user, a second utterance sentence that is a sentence uttered by a second user and is a response to the first utterance sentence, and a third utterance sentence that is a sentence uttered by the first user and is a response to the second utterance sentence, a set of the first utterance sentence and the second utterance sentence of the data is generated as dialogue data when the second utterance sentence of the data is a question sentence using an interrogative. As a result, it is possible to generate dialogue data for generating a question sentence to deeply delve conversation at a low cost.

Further, the dialogue data generation unit of the dialogue data generation device according to the present invention can generate, for each of the plurality of pieces of data received by the input unit, a set of the first utterance sentence of the data and the second utterance sentence of the data as dialogue data when the second utterance sentence of the data contains an interrogative related to a tense, a place, a subject, a target, a reason, a method, a degree, or a state and is a question sentence.

Further, the dialogue data generation device according to the present invention can further include: a question generation model learning unit that learns, for each of a plurality of pieces of dialogue data obtained by the dialogue data generation unit, a neural network for generating a sentence from an input sentence so that the second utterance sentence contained in the dialogue data is output when the first utterance sentence contained in the dialogue data is input.

The dialogue data generation device according to the present invention can further include: a question sentence generation unit that inputs a received utterance sentence to the neural network and handles an output of the neural network as a question sentence corresponding to the utterance sentence.

A program according to the present invention is a program for realizing functioning as each of the units of the above dialogue data generation device.

EFFECTS OF THE INVENTION

According to the dialogue data generation device, the dialogue data generation method, and the program of the present invention, it is possible to generate dialogue data for generating a question sentence to deeply delve conversation at a low cost.

BRIEF DESCRIPTION OF DRAWINGS

FIG. 3 is an image diagram showing an example of data received by the input unit of the dialogue data generation device according to the embodiment of the present invention.

FIG. 4 is an image diagram showing an example of dialogue data generated by the dialogue data generation unit of the dialogue data generation device according to the embodiment of the present invention.

DESCRIPTION OF EMBODIMENTS

Hereinafter, an embodiment of the present invention will be described with reference to the drawings.

Figure 1:
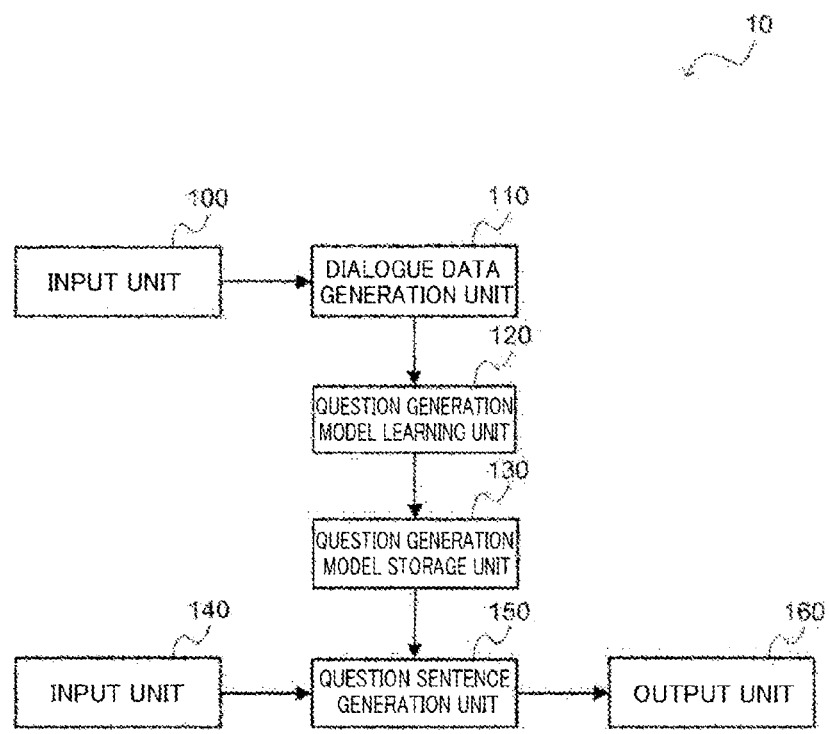
FIG. 1 is a schematic diagram showing the configuration of a dialogue data generation device according to an embodiment of the present invention.

Configuration of Dialogue Data Generation Device According to Embodiment of Present Invention The configuration of a dialogue data generation device 10 according to the embodiment of the present invention will be described with reference to FIG. 1. FIG. 1 is a block diagram showing the configuration of the dialogue data generation device 10 according to the embodiment of the present invention.

The dialogue data generation device 10 is constituted by a computer including a CPU, a RAM, and a ROM storing a program for performing a model learning processing routine and a question sentence generation processing routine that will be described later, and is functionally configured as follows.

As shown in FIG. 1, the dialogue data generation device 10 according to the embodiment is constituted by an input unit 100, a dialogue data generation unit 110, a question generation model learning unit 120, a question generation model storage unit 130, an input unit 140, a question sentence generation unit 150, and an output unit 160.

The input unit 100 receives the input of a plurality of pieces of data each including a set of a first utterance sentence that is a sentence uttered by a first user, a second utterance sentence that is a sentence uttered by a second user and is a response to the first utterance sentence, and a third utterance sentence that is a sentence uttered by the first user and is a response to the second utterance sentence.

The plurality of pieces of data are those obtained by extracting and collecting in advance sets of first utterance sentences that are utterances given by the first user, second utterance sentences that are responses made by the second user in response to the first utterance sentences, and third utterance sentences that are responses made by the first user in response to the second utterance sentences from a chat system, a social networking service (SNS) in which utterance sentences are posted, or the like.

Figure 2:
FIG. 2 is an image diagram showing an example of data received by the input unit of the dialogue data generation device according to the embodiment of the present invention.

For example, as shown in FIG. 2, when a first user A gives the utterance "I went to Kyoto recently.", the utterance is handled as a first utterance sentence. Then, when a second user B gives the utterance "What did you go there to do?" in response to the first utterance sentence, the utterance is handled as a second utterance sentence. Moreover, when the user A gives the utterance "I went to there to see the autumn leaves. It was beautiful." in response to the second utterance sentence, the utterance is handled as a third utterance sentence.

Note that the plurality of pieces of data may be configured to be input to the input unit 100 from a chart system, an SNS, or the like open to the public on the Internet by a device or the like that automatically collects the plurality of pieces of data.

Then, when receiving the input of such a plurality of pieces of data each including a set of a first utterance sentence, a second utterance sentence, and a third utterance sentence, the input unit 100 transfers the plurality of pieces of data to the dialogue data generation unit 110.

For each of a plurality of pieces of data received by the input unit 100, the dialogue data generation unit 110 generates a set of the first utterance sentence of the data and the second utterance sentence of the data as dialogue data when the second utterance sentence of the data contains an interrogative related to a tense, a place, a subject, a target, a reason, a method, a degree, or a state and is a question sentence.

Specifically, for each of a plurality of pieces of data, the dialogue data generation unit 110 first determines whether the second utterance sentence of the data is a question sentence and contains an interrogative used to ask a question about so-called 5W1H (When, Where, Who, What, Why, How).

That is, the dialogue data generation unit 110 determines whether the second utterance sentence is a 5W1H question rather than determining whether the second utterance sentence is the utterance of a simple question sentence (such as an utterance ending with "?").

This is because it is necessary to make a talk continuous as long as possible in a chat dialogue. Therefore, if the second utterance sentence is a question answerable by Yes/No, a dialogue ends at the time that the other party answers a question.

Therefore, in order to make a dialogue continuous with a question to deeply delve the content of an utterance, dialogue data is created by questions based on the 5W1H. Note that instead of the 5W1H, any interrogative such as "Whom" and "Whose" used to ask a question not answerable by Yes/No may only be contained.

For example, for each of a plurality of pieces of data shown in FIG. 3, the utterance of the second utterance sentence "What did you go there to do?" of the top data is a question sentence containing a word that is an interrogative used to ask about a subject of "What to do?". Therefore, the dialogue data generation unit 110 handles a set of the first utterance sentence "I went to Kyoto recently." of the data and the second utterance sentence as dialogue data.

Further, for example, the second utterance sentence "Friday is a day for a drinking party, right?" of the bottom data in FIG. 3 is a question sentence but is a question answerable by Yes/No. Therefore, the dialogue data generation unit 110 does not handle a set of the first utterance sentence and the second utterance sentence of the data as dialogue data.

Further, since a third utterance sentence right after a second utterance sentence is a response made by the first user in response to the second utterance sentence, it is presumed that the second utterance sentence that is a question sentence using an interrogative has high quality as a question sentence to deeply delve the content of an utterance.

Further, in order to determine whether the second utterance sentence is a question sentence asking a question based on the 5W1H, the dialogue data generation unit 110 may use a determination device that has performed learning in advance.

Then, the dialogue data generation unit 110 transfers a plurality of pieces of generated dialogue data to the question generation model learning unit 120.

The question generation model learning unit 120 learns, for each of a plurality of pieces of dialogue data, a neural network for generating a sentence from an input sentence so that a second utterance sentence contained in the dialogue data is output when a first utterance sentence contained in the dialogue data is input.

Specifically, the question generation model learning unit 120 learns, for each of a plurality of pieces of dialogue data generated by the dialogue data generation unit 110, a question generation model that is a neural network for generating a sentence from an input sentence so that a question sentence that is a response to an utterance sentence becomes the second utterance sentence of the dialogue data when the first utterance sentence of the dialogue data is input as an utterance sentence (FIG. 4).

For example, the question generation model learning unit 120 learns the question generation model within an encoder-decoder framework. That is, the question generation model learning unit 120 learns the question generation model using an encoder and a decoder so that the first utterance sentence of the dialogue data is input as an utterance sentence (input) and the second utterance sentence of the dialogue data becomes a question sentence (output) (for example, Reference Literature 1).

[Reference Literature 1] Oriol Vinyals, Quoc Le, "A Neural Conversational Model", [online], 2015, Internet <URL: https://arxiv.org/abs/1506.05869>.

Then, the question generation model learning unit 120 stores a learned question generation model in the question generation model storage unit 130.

The question generation model storage unit 130 stores a learned question generation model.

The input unit 140 receives the input of an utterance sentence from a dialogue system, a user, or the like and transfers the received utterance sentence to the question sentence generation unit 150.

The question sentence generation unit 150 inputs a received utterance sentence to a neural network and handles the output of the neural network as a question sentence corresponding to the utterance sentence.

Specifically, the question sentence generation unit 150 first receives a question generation model from the question generation model storage unit 130.

Next, upon receiving an utterance sentence from the input unit 140, the question sentence generation unit 150 inputs the utterance sentence to the received question generation model to generate a question sentence using an interrogative.

Here, by using the encoder and the decoder, the question sentence generation unit 150 can generate a question sentence using an interrogative even if the utterance sentence does not correspond to the first utterance sentence of any generated dialogue data.

Then, the question sentence generation unit 150 transfers the generated question sentence to the output unit 160.

The output unit 160 outputs the generated question sentence. For example, the output unit 160 outputs, as the utterance of a dialogue system, the question sentence to a user holding a dialogue with the dialogue system through a method such as displaying the question sentence.

Figure 5:
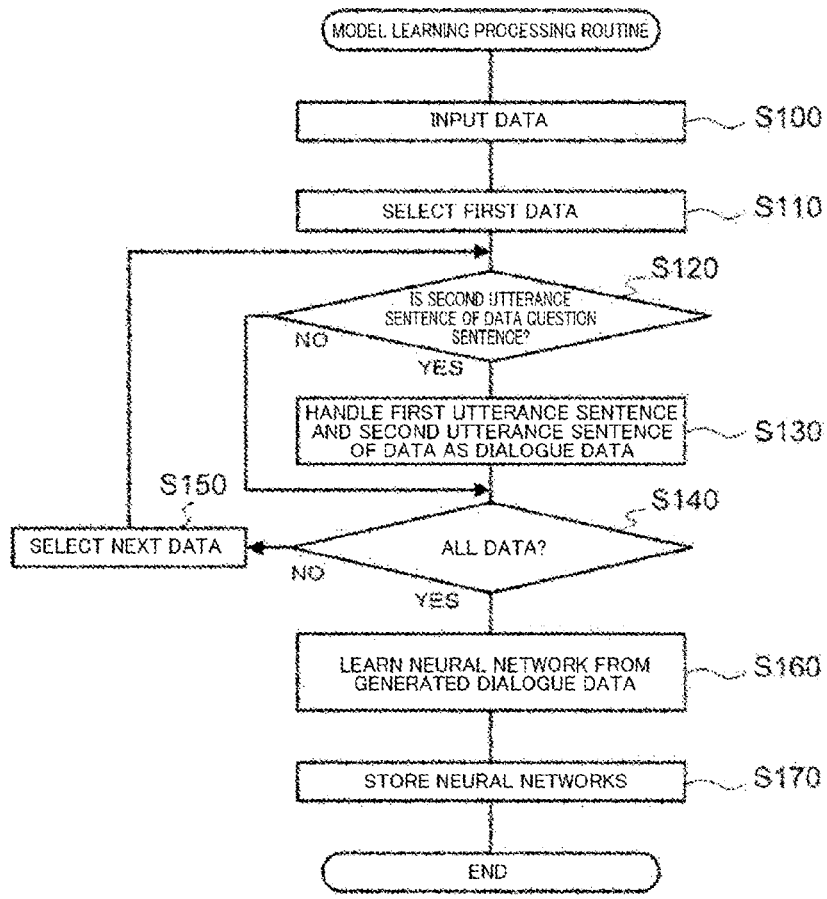
FIG. 5 is a flowchart showing the model learning processing routine of the dialogue data generation device according to the embodiment of the present invention.

Operation of Dialogue Data Generation Device According to Embodiment of Present Invention FIG. 5 is a flowchart showing a model learning processing routine according to the embodiment of the present invention.

Upon receiving data by the input unit 100, the dialogue data generation device 10 performs the model learning processing routine shown in FIG. 5.

First, in step S100, the input unit 100 receives the input of a plurality of pieces of data each including a set of a first utterance sentence that is a sentence uttered by a first user, a second utterance sentence that is a sentence uttered by a second user and is a response to the first utterance sentence, and a third utterance sentence that is a sentence uttered by the first user and is a response to the second utterance sentence.

In step S110, the dialogue data generation unit 110 selects the first data from among the plurality of pieces of data received in step S100.

In step S120, the dialogue data generation unit 110 determines whether the second utterance sentence of the data is a question sentence containing an interrogative related to a tense, a place, a subject, a target, a reason, a method, a degree, or a state.

When the second utterance sentence of the selected data is not a question sentence containing an interrogative (NO in step S120), the processing proceeds to step S140.

On the other hand, when the second utterance sentence of the selected data is a question sentence containing an interrogative (YES in step S120), the dialogue data generation unit 110 generates a set of the first utterance sentence of the data and the second utterance sentence of the data as dialogue data in step S130.

In step S140, the dialogue data generation unit 110 determines whether all the plurality of pieces of received data have been subjected to the above processing.

When all the plurality of pieces of data have not been subjected to the processing (NO in step S140), the dialogue data generation unit 110 selects the next data in step S150.

On the other hand, when all the plurality of pieces of data have been subjected to the processing (YES in step S140), in step S160, the question generation model learning unit 120 learns, for each of a plurality of pieces of generated dialogue data, a neural network for generating a sentence from an input sentence so that the second utterance sentence contained in the dialogue data is output when the first utterance sentence contained in the dialogue data is input.

In step S170, the question generation model learning unit 120 stores the learned neural networks in the question generation model storage unit 130.

Figure 6:
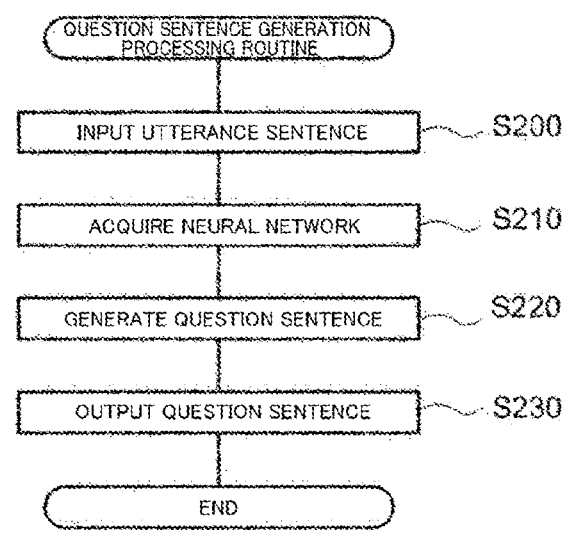
FIG. 6 is a flowchart showing the question sentence generation processing routine of the dialogue data generation device according to the embodiment of the present invention.

FIG. 6 is a flowchart showing a question sentence generation processing routine according to the embodiment of the present invention.

Upon receiving an utterance sentence by the input unit 140, the dialogue data generation device 10 performs the question sentence generation processing routine shown in FIG. 6.

First, in step S200, the input unit 140 receives the input of an utterance sentence from a dialogue system, a user, or the like.

In step S210, the question sentence generation unit 150 acquires a neural network from the question generation model storage unit 130.

In step S220, the question sentence generation unit 150 inputs the received utterance sentence to the neural network and handles the output of the neural network as a question sentence that is a response to the utterance sentence.

In step S230, the output unit 160 outputs the generated question sentence.

As described above, for each of a plurality of pieces of data each including a set of a first utterance sentence that is a sentence uttered by a first user, a second utterance sentence that is a sentence uttered by a second user and is a response to the first utterance sentence, and a third utterance sentence that is a sentence uttered by the first user and is a response to the second utterance sentence, the dialogue data generation device according to the embodiment of the present invention handles the first utterance sentence and the second utterance sentence of the data as dialogue data when the second utterance sentence of the data is a question sentence and a positive sentence or a negative sentence is not made as a response to the second utterance sentence. As a result, it is possible to generate dialogue data for generating a question sentence to deeply delve conversation at a low cost.

Note that the present invention is not limited to the above embodiment but various modifications or applications are made possible without departing from the spirit of the present invention.

In the above embodiment, the question sentence generation unit 150 generates a question sentence using neural networks learned on the basis of a plurality of pieces of dialogue data. However, the question sentence generation unit 150 may generate a question sentence using a plurality of pieces of generated dialogue data instead of neural networks.

For example, when a received utterance sentence is the same as or most likely to be similar to the first utterance sentence of any of a plurality of pieces of generated dialogue data, the question sentence generation unit 150 may generate the second utterance sentence of the dialogue data as a question sentence.

Further, a plurality of pieces of dialogue data may be used as scenarios for chat dialogues.

Further, examples of the above embodiment include, but not limited to, a case in which a third utterance sentence is used only from the viewpoint of whether the third utterance sentence is a response made by a person who has made a first utterance sentence in response to a second utterance sentence and in which data including a set of a first utterance sentence, a second utterance sentence, and a third utterance sentence collected from a chat system, a social networking service (SNS) in which utterance sentences are posted, or the like is input.

A determination is made as to whether a third utterance sentence is appropriate as a response to a second utterance sentence, and only data in which a third utterance sentence is determined to be appropriate as a response to a second utterance sentence may be input as data including a set of a first utterance sentence, a second utterance sentence, and a third utterance sentence.

Thus, it is possible to enhance the quality of a second utterance sentence generated as dialogue data as a question sentence for deeply delving.

Note that for a determination as to whether a third utterance sentence is appropriate as a response to a second utterance sentence, it is possible to use a method in which the input of a result confirmed by visual recognition is received, a method in which a determination as to whether the relationship between a second utterance sentence and a third utterance sentence is a response relationship is automatically made, or the like.

Further, the embodiment in which a program is installed in advance is described in the present specification, but it is also possible to provide the program in a state of being stored in a computer-readable recording medium.

REFERENCE SIGNS LIST 10 dialogue data generation device
100 input unit
110 dialogue data generation unit
120 question generation model learning unit 130 question generation model storage unit
140 input unit
150 question sentence generation unit
160 output unit

The invention claimed is:

1. A computer-implemented method for automatically generating dialogue data in a conversation, the method comprising:
receiving a plurality of sets of data, wherein each set of data includes:
a first utterance sentence made by a first participant of a dialogue,
a second utterance sentence made by a second participant in response to the first utterance sentence in the dialogue, and
a third utterance sentence made by the first participant in response to the second utterance sentence in the dialogue; and
for each set of the received plurality of sets of data, when the second utterance sentence is a question sentence using an interrogative, automatically generating a pair of the first utterance sentence and the second utterance sentence as dialogue data.

2. The computer-implemented method of claim 1, wherein the question sentence is based on one of interrogatives associated with at least one of a tense, a place, a subject matter, a target matter, a reason, a method, a degree, or a state.

3. The computer-implemented method of claim 1, the method further comprising:
receiving an input utterance sentence; and
generating, based at least on the pair of the first utterance sentence and the second utterance sentence, an output utterance sentence in response to the input utterance sentence, wherein the output utterance sentence is a question subsequent to the input utterance sentence, and wherein the input utterance sentence matches with the first utterance sentence.

4. The computer-implemented method of claim 1, wherein the first participant and the second participant are distinct.

5. The computer-implemented method of claim 1, wherein a relationship between the second utterance sentence and the third utterance sentence is a response relationship.

6. The computer-implemented method of claim 1, the method further comprising:
training, based at least on the automatically generated pair of the first sentence utterance and the second utterance sentence, a neural network, wherein the neural network generates a sentence based on the second utterance sentence in response to an input sentence, and wherein the input sentence includes the first utterance sentence.

7. The computer-implemented method of claim 6, the method further comprising:
receiving an input utterance sentence; and
generating, using the received input utterance sentence as an input to the trained neural network, an output utterance sentence, wherein the output utterance sentence is a question sentence associated with the received utterance sentence based on an output from the trained neural network.

8. A system for automatically generating dialogue data in a conversation, the system comprises:
a processor; and
a memory storing computer-executable instructions that when executed by the processor cause the system to:
receive a plurality of sets of data, wherein each set of data includes:
a first utterance sentence made by a first participant of a dialogue,
a second utterance sentence made by a second participant in response to the first utterance sentence in the dialogue, and
a third utterance sentence made by the first participant in response to the second utterance sentence in the dialogue; and
for each set of the received plurality of sets of data, when the second utterance sentence is a question sentence using an interrogative, automatically generate a pair of the first utterance sentence and the second utterance sentence as dialogue data.

9. The system of claim 8, wherein the question sentence is based on one of interrogatives associated with at least one of a tense, a place, a subject matter, a target matter, a reason, a method, a degree, or a state.

10. The system of claim 8, the computer-executable instructions when executed further causing the system to:
receive an input utterance sentence; and
generate, based at least on the pair of the first utterance sentence and the second utterance sentence, an output utterance sentence in response to the input utterance sentence, wherein the output utterance sentence is a question subsequent to the input utterance sentence, and wherein the input utterance sentence matches with the first utterance sentence.

11. The system of claim 8, wherein the first participant and the second participant are distinct.

12. The system of claim 8, wherein a relationship between the second utterance sentence and the third utterance sentence is a response relationship.

13. The system of claim 8, the computer-executable instructions when executed further causing the system to:
train, based at least on the automatically generated pair of the first sentence utterance and the second utterance sentence, a neural network, wherein the neural network generates a sentence based on the second utterance sentence in response to an input sentence, and wherein the input sentence includes the first utterance sentence.

14. The system of claim 13, the computer-executable instructions when executed further causing the system to:
receive an input utterance sentence; and
generate, using the received input utterance sentence as an input to the trained neural network, an output utterance sentence, wherein the output utterance sentence is a question sentence associated with the received utterance sentence based on an output from the trained neural network.

15. A computer-readable non-transitory recording medium storing computer-executable instructions that when executed by a processor cause a computer system to:
receive a plurality of sets of data, wherein each set of data includes:
a first utterance sentence made by a first participant of a dialogue,
a second utterance sentence made by a second participant in response to the first utterance sentence in the dialogue, and
a third utterance sentence made by the first participant in response to the second utterance sentence in the dialogue; and
for each set of the received plurality of sets of data, when the second utterance sentence is a question sentence using an interrogative, automatically generate a pair of the first utterance sentence and the second utterance sentence as dialogue data.

16. The computer-readable non-transitory recording medium of claim 15, wherein the question sentence is based on one of interrogatives associated with at least one of a tense, a place, a subject matter, a target matter, a reason, a method, a degree, or a state.

17. The computer-readable non-transitory recording medium of claim 15, the computer-executable instructions when executed further causing the system to:
receive an input utterance sentence; and
generate, based at least on the pair of the first utterance sentence and the second utterance sentence, an output utterance sentence in response to the input utterance sentence, wherein the output utterance sentence is a question subsequent to the input utterance sentence, and wherein the input utterance sentence matches with the first utterance sentence.

18. The computer-readable non-transitory recording medium of claim 15, wherein the first participant and the second participant are distinct.

19. The computer-readable non-transitory recording medium of claim 15, the computer-executable instructions when executed further causing the system to:
train, based at least on the automatically generated pair of the first sentence utterance and the second utterance sentence, a neural network, wherein the neural network generates a sentence based on the second utterance sentence in response to an input sentence, and wherein the input sentence includes the first utterance sentence.

20. The computer-readable non-transitory recording medium of claim 15, the computer-executable instructions when executed further causing the system to:
receive an input utterance sentence; and
generate, using the received input utterance sentence as the input sentence to the trained neural network, an output utterance sentence, wherein the output utterance sentence is a question sentence associated with the received utterance sentence based on an output sentence from the trained neural network.

* * * * *